Patented July 29, 1947

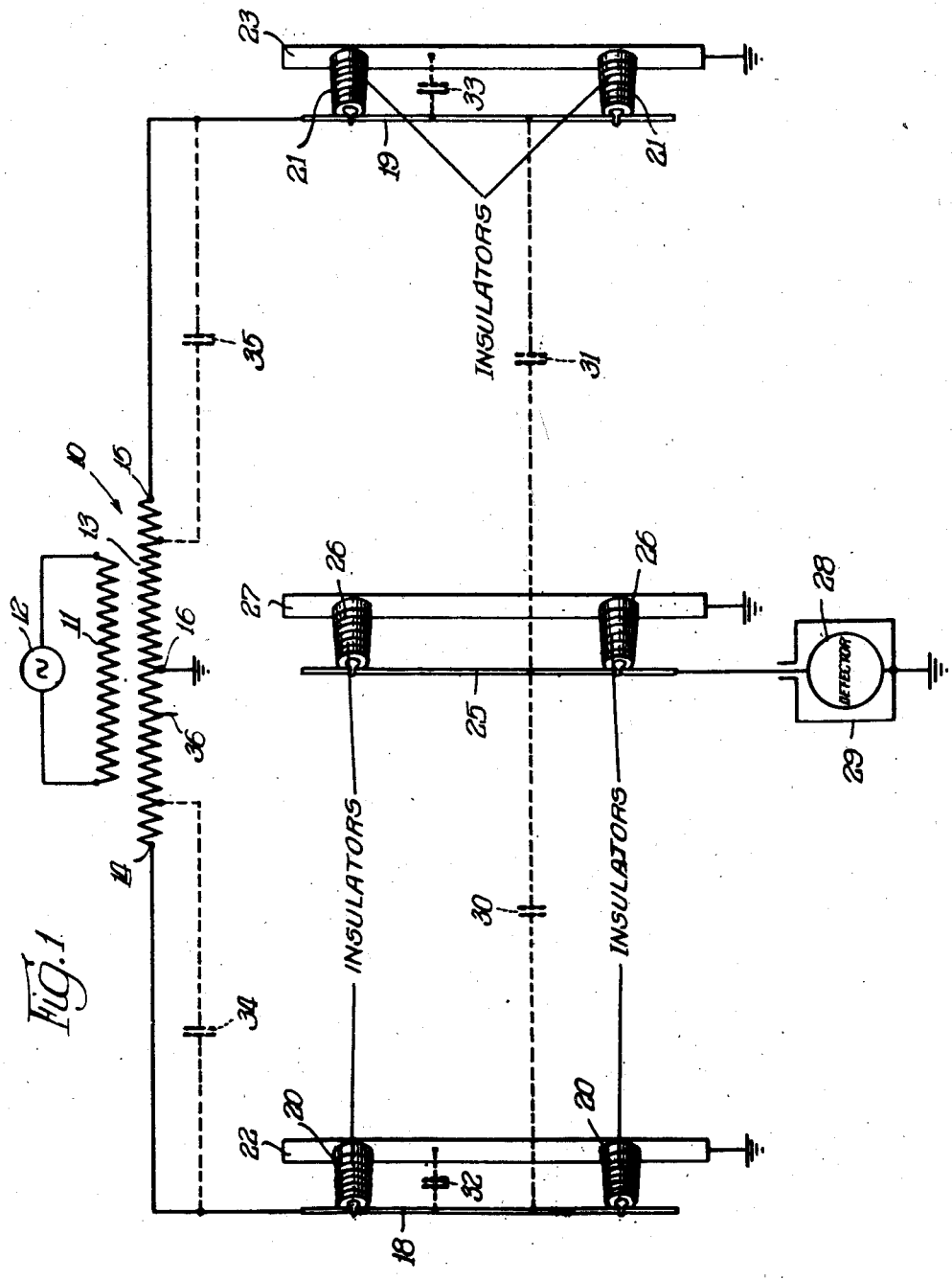

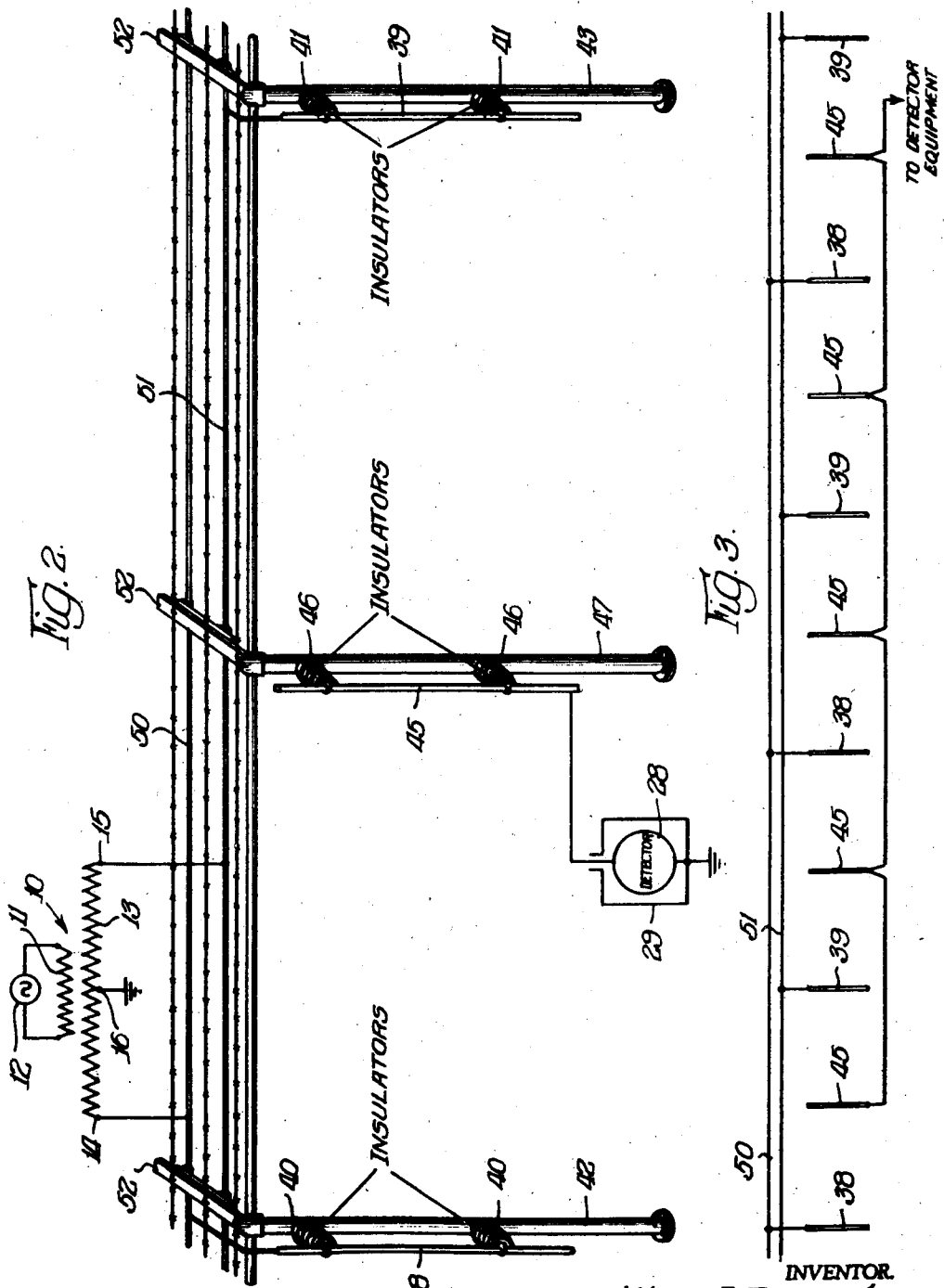

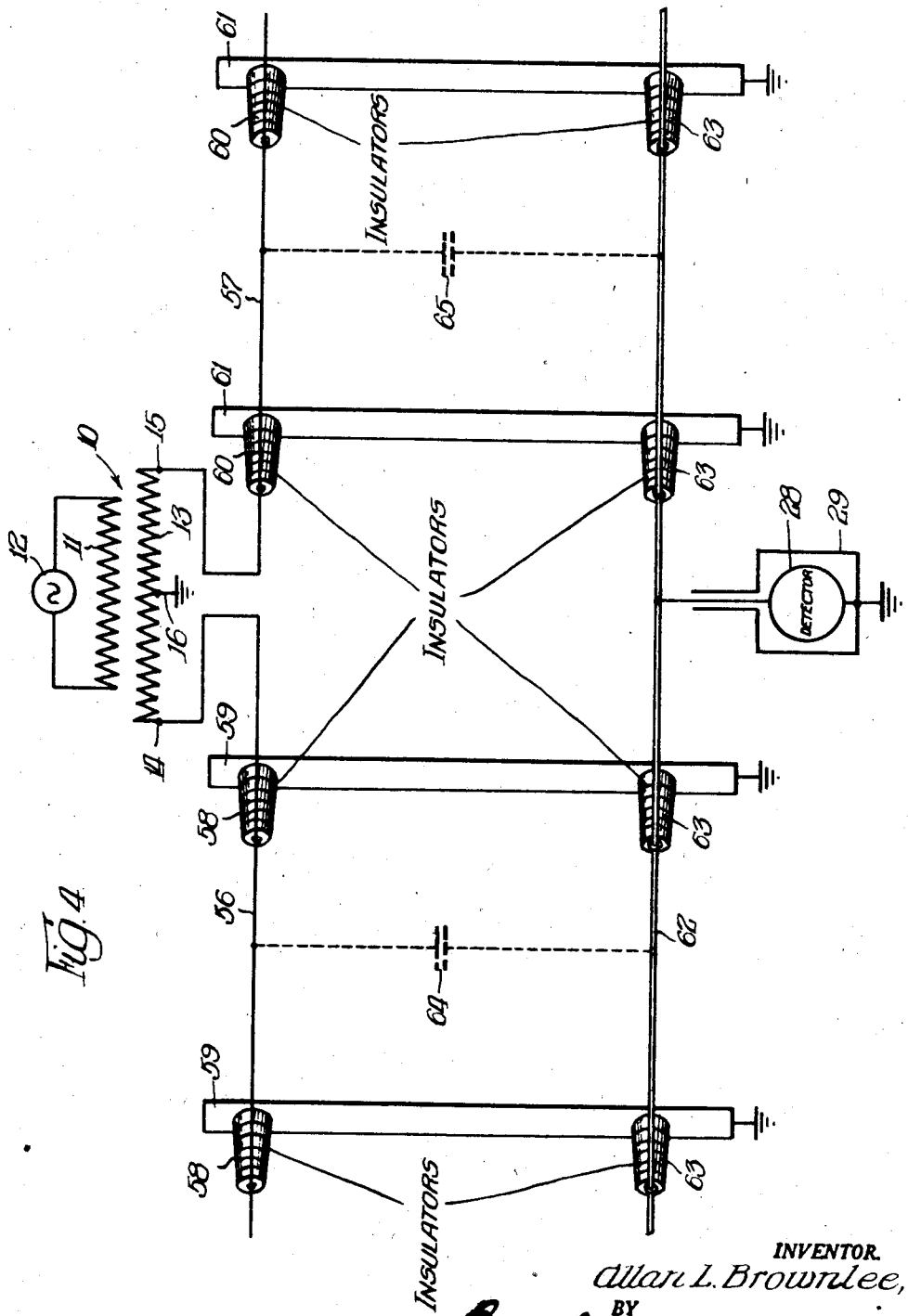

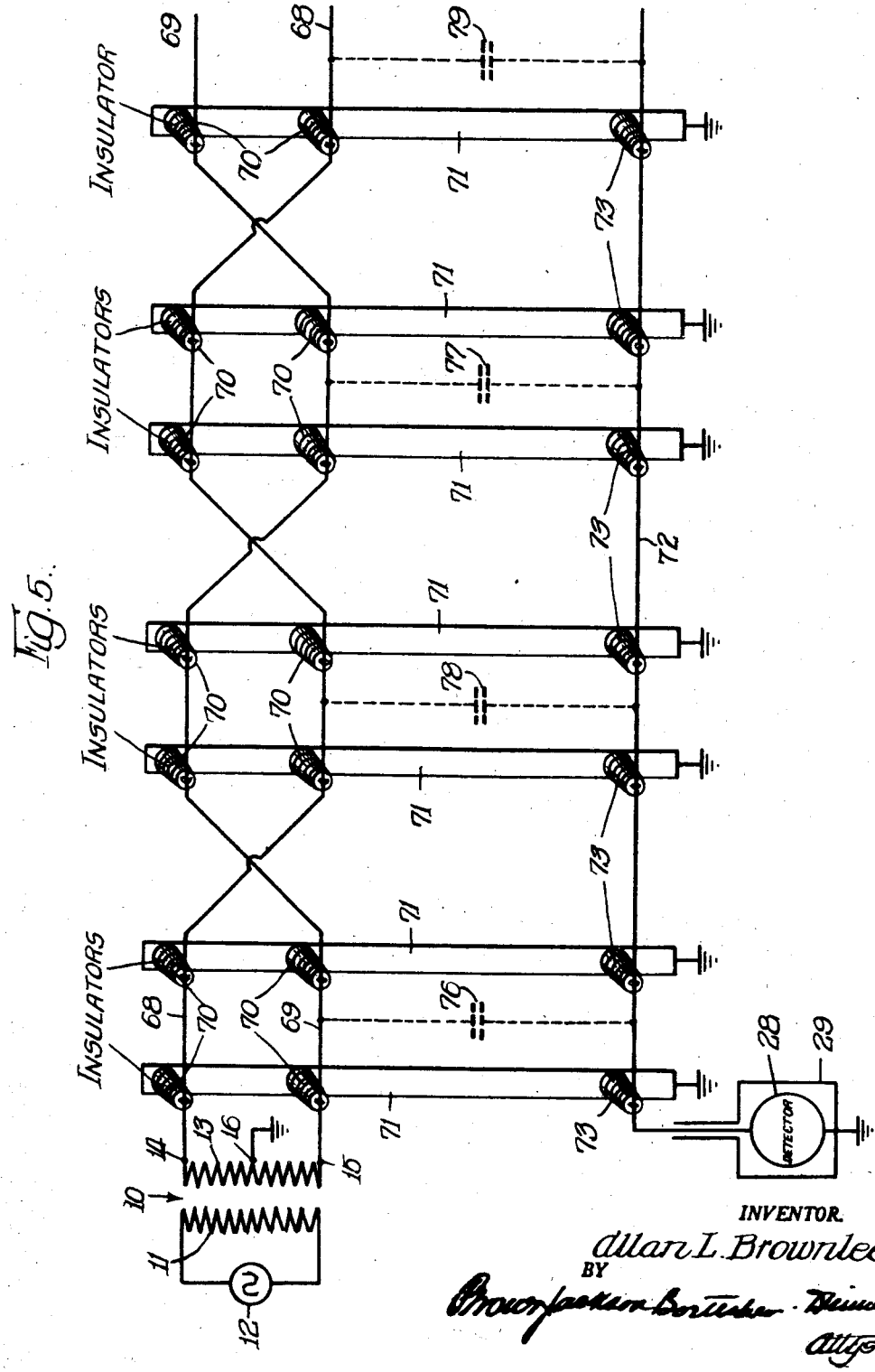

2,424,677

UNITED STATES PATENT OFFICE 2,424,677

APPROACH PROTECTIVE APPARATUS

Allan L. Brownlee, Itasca, Ill.

Application October 26, 1942, Serial No. 463,314

10 Claims. (Cl. 177—352)

My invention relates, generally, to detecting apparatus and it has particular relation to apparatus for detecting the presence of a foreign body such as a trespasser on property where the presence of such persons is forbidden.

It has been proposed in the past to employ a change in the dielectric characteristic between two charged electrodes caused by the introduction of a foreign body such as a trespasser for indicating the presence of such trespasser. In general, such systems have comprised an electrode which is insulated from ground and constitutes one plate of a capacitor. The other plate of the capacitor is the ground. A source of high voltage alternating current is connected between the electrode and ground for maintaining the necessary difference of potential. Various means have been suggested for measuring the difference in the character of the dielectric between the electrode and ground due to the presence of a foreign body therebetween.

An important disadvantage of such systems has been that they are adversely affected by change in weather conditions and it has been necessary to resort to complicated and inefficient means for overcoming this difficulty. The principal disadvantage resides in the fact that the electrode is insulated from ground and that this insulation constitutes a major portion of the dielectric between the electrode and ground. Now when this insulation is subjected to rain, sleet or snow conditions, it is changed materially and consequently the calibration of the apparatus is correspondingly affected although no foreign body is present which the apparatus is intended to detect.

In view of the foregoing it is an object of my invention to provide for detecting the presence of a foreign body such as a trespasser on property out of doors regardless of the weather conditions that may exist.

Another object of my invention is to provide for automatically compensating for changes in weather conditions which might otherwise adversely affect apparatus for detecting the presence of a foreign body such as a trespasser on property from which entrance by the public is forbidden.

Other objects of my invention will, in part, be obvious and in part appear hereinafter.

For a more complete understanding of the nature and scope of my invention reference can be had to the following detailed description taken in connection with the accompanying drawings in which:

Figure 1 illustrates, diagrammatically, the fundamental features of my invention;

Figure 2 is a view, partly in perspective and partly diagrammatic, showing a typical application of my invention to the protection of property;

Figure 3 illustrates, diagrammatically, the manner in which the elements making up the invention can be extended for enlarging the scope of protection afforded thereby; and Figures 4 and 5 illustrate, diagrammatically, further modifications of my invention.

Referring now particularly to Figure 1 of the drawings, it will be observed that the reference character 10 designates, generally, a transformer having a primary winding 11 that is arranged to be energized from a suitable source 12 of alternating current. The source 12 is employed to represent the conventional alternating current source which may be of the order of 120 or 240 volts, or any other suitable source, as will be readily understood. The transformer 10 also includes a secondary winding 13 which is arranged to operate at a relatively high voltage such as 5000 volts between its terminals 14 and 15. A mid-tap 16 is provided between the terminals 14 and 15 and it is arranged to be grounded, as illustrated. It will be understood then that one-half of the voltage of the secondary winding 13 appears between the terminal 14 and the mid-tap 16 and that the other half appears between the mid-tap 16 and the terminal 15. It will be understood that other voltages than 5000 volts can be used if desired without departing from the spirit and scope of this invention.

Connected to the terminals 14 and 15 of the secondary winding 13 are electrodes 18 and 19 which are mounted in insulated spaced relation by insulators 20 and 21, as shown. The insulators 20 and 21 are carried by suitable supports 22 and 23, each of which is grounded, as illustrated. As will hereinafter appear, the electrodes 18 and 19 may be mounted on alternate fence posts which take the place of the supports 22 and 23. The electrodes 18 and 19 may be in the form of bare conductors. However, it is preferable for the sake of safety to enclose the electrodes 18 and 19 in suitable insulation.

Located symmetrically between the electrodes 18 and 19 is a detector electrode 25 which is carried on insulators 26 that are supported by a suitable support 27 which, as shown, is grounded. It will be understood that the detector electrode 25 can be mounted on a fence post intermediate the fence posts on which the electrodes 18 and 19 are mounted and that the support 27 may comprise the intermediate fence post.

A detector 28 is connected between the detector electrode 25 and ground. It is surrounded by a suitable electro-static shield 29 which prevents the detector 28 from being affected by extraneous influences and makes it responsive solely to current flow between the detector electrode 25 and ground. The detector 28 may be of any suitable character, such as an electronic detector which will measure the flow of current between the detector electrode 25 and ground. It may be arranged to operate suitable signalling means or other apparatus to give an alarm under certain predetermined conditions which will be set forth hereinafter.

The detector electrode 25 is located with respect to the electrodes 18 and 19 so that the electro-static capacity as represented by the capacitor 30 in broken lines between the electrodes 18 and 25 is substantially equal to the electro-static capacity represented by the capacitor 31 in broken lines between the electrodes 25 and 19. Thus a balanced condition exists between the electrodes 18 and 25 and 25 and 19 and consequently no current flows through the detector 28.

Preferably, the electrodes 18 and 19 are spaced about twenty feet apart with the detector electrode 25 midway therebetween or about ten feet from each electrode 18 and 19. Now, if a foreign body, such as a trespasser, approaches the space between the electrodes 18 and 25, for example, the character of the dielectric therebetween is changed and the previously maintained balance is upset. Consequently, current flows through the detector 28 in an amount which depends upon the character of the change. A suitable alarm is given in response to the change in current flow as measured by the detector 28 and appropriate steps may then be taken as the situation may warrant.

Because of the symmetrical relationship of the detector electrode 25 with respect to the electrodes 18 and 19, the operation of the system is unaffected by changes in weather conditions. For example, the presence of rain, sleet or snow will affect the character of the dielectric between the electrodes 18 and 25 and 25 and 19 in substantially the same manner so that there will be no resultant difference in these dielectrics and consequently there will be no change in the current flow as measured by the detector 28.

The capacitance of the electrode 18 to ground can be represented by the capacitor 32 shown in broken lines. In like manner the capacitance of the electrode 19 to ground can be represented by the capacitor 33 shown in broken lines. The capacitance of capacitors 32 and 33 will change depending upon the character of the insulators 20 and 21 under different conditions. For example, when the weather is dry the effective dielectric for the capacitors 32 and 33 will be relatively high. Under adverse weather conditions when the insulators 20 and 21 are wet, their dielectric value is correspondingly reduced. These changes may or may not be identical for the capacitors 32 and 33. However, this makes no difference in the operation of the system in view of the fact that whatever current may flow through the circuit represented by the capacitors 32 and 33 does not flow through the detector 28 and consequently it is unaffected.

The capacitance between the electrode 18 and the secondary winding 13 can be represented by the capacitor 34 shown in broken lines. Likewise, the capacitance between the electrode 19 and the secondary winding 13 can be represented by the capacitor 35 also shown in broken lines. The capacitance of these circuits as represented by capacitors 34 and 35 may vary depending upon weather conditions and other conditions. The capacitance of these circuits may be the same or may be different, but still the operation of the detector 28 is unaffected since none of the current flowing through the circuits represented by the capacitors 34 and 35 flows through the detector 28.

Of course there is theoretically the possibility that two persons might be placed between the electrodes 18 and 25 and 25 and 19 in such manner that the balance is not upset. It will be obvious that the occurrence of such a condition is extremely unlikely and ordinarily this may be disregarded. However, if it is desired to provide for this eventuality then the secondary winding 13 can be grounded at a point other than the mid-tap 16. For example, it can be grounded at an off-center tap as indicated by the tap 36. The detector 28 can then be adjusted to take care of this slight unbalance. Alternatively, the detector electrode 25 can be located slightly unsymmetrically with respect to the electrodes 18 and 19.

It will be obvious that the system shown in Figure 1 and described hereinbefore is not affected by changes in frequency of the source 12. If it should occur that the system is likely to be affected by an adjacent power circuit operating at a conventional frequency, such as 60 cycles per second, then a higher frequency can be employed for the source 12, such as 120 or 240 cycles per second and a suitable filter can be provided in the circuit to the detector 28 so that it will be responsive only to frequencies above 60 cycles.

In Figure 2 of the drawings there is shown a section of a fence to which the present invention has been applied. It will be observed that electrodes 38 and 39 are carried by insulators 40 and 41 which are mounted on fence posts 42 and 43. A detector electrode 45 is mounted on insulators 46 that are carried by an intermediate fence post 47.

As shown in Figure 3 of the drawings several pairs of electrodes 38 and 39 are provided with a detector electrode 45 for each pair and located midway the electrodes making up each pair. The number of pairs of electrodes 38 and 39 and the number of detector electrodes 45 will be governed by the particular conditions involved. In a particular installation involving a fence of 2,200 feet in length, the installation would be divided into twenty 110 foot sections and duplicate apparatus would be installed for each section.

As shown in Figures 2 and 3 of the drawings conductors 50 and 51 are provided for interconnecting the electrodes 38 and 39, respectively. The conductors 50 and 51 can be mounted in any suitable manner such as on support arms 52 carried by the fence posts 42, 43 and 47, as shown. The conductors 50 and 51 can be connected to the terminals 14 and 15 of the secondary winding 13 of the transformer 10 previously described.

Each of the detector electrodes 45 can be provided with its own detector 28 and shield 29, as shown in Figure 2. However, it may be desirable to connect all of the detector electrodes 45 of one section together, as shown in Figure 3, and then to connect them to the detector equipment. When the system shown in Figure 3 is used it is desirable to extend the shield from the detecting equipment to each of the detector electrodes 45. When an individual detector 28 is employed for each of the detector eelctrodes 45, it is unnecessary to use such extensive shielding, it being necessary only to extend the shielding from each detector 28 to its associated detector electrode 45.

In Figure 4 of the drawings there is shown a property protection system which is somewhat less expensive in construction than the apparatus shown in Figures 1 and 2 and described hereinbefore.

It will be observed that the transformer 10 and source 12 described hereinbefore are employed in the system shown in Figure 4. Also the same detector 28 and shield 29 therefor are employed. However, the arrangement of the electrodes with respect to the detector electrode is different.

It will be observed that a pair of electrodes 56 and 57 is provided. These electrodes can be in the form of wires and are connected for energization to the terminals 14 and 15 of the high voltage secondary winding 13, as shown. The electrode 56 is carried by insulators 58 on supports 59 which are grounded. The electrode 57 is likewise carried by insulators 60 which are mounted on grounded supports 61. It will be observed that the electrodes 56 and 57 extend in opposite directions.

Below the electrodes 56 and 57 and in parallel spaced relation with respect thereto is a detector electrode 62. The detector electrode 62 is carried by insulators 63 that may be mounted, as shown, on the supports 59 and 61. The detector 28 is connected between the detector electrode 62 and ground.

The capacitance between electrode 56 and the detector electrode 62 can be illustrated by the capacitor 64 shown in broken lines. Likewise, the capacitance between the electrode 57 and the detector electrode 62 can be illustrated by the capacitor 65 also shown in broken lines. Now, under normal operating conditions the capacitance of capacitor 64 substantially equals the capacitance of capacitor 65. Because of this no potential exists between the detector electrode 62 and ground and consequently no current flows through the detector 28.

When this symmetrical capacitance relationship is disturbed, as by the presence of a foreign body between either the electrode 56 and detector electrode 62 or between the electrode 57 and the detector electrode 62, this symmetrical capacitance relationship will no longer obtain. As the result current will flow to ground through the detector 28 which will be measured thereby. A suitable alarm then can be given as will be readily understood.

In the system shown in Figure 4 stray currents through stray capacitance to ground are local to the transformer and do not affect the detector 28. Capacitance between the detector electrode 62 and ground in parallel with the detector 28 merely affects its sensitivity but not its function in detecting the unbalance which may exist between the capacitors 64 and 65 as described.

In Figure 5 of the drawings there is illustrated, diagrammatically, still another embodiment of the invention. It will be observed that the same transformer 10 is employed, as previously described, having a primary winding 11 energized from a source 12 of alternating current and a high voltage secondary winding 13. Likewise, the same detector 28 and shield 29 are employed.

In the construction shown in Figure 5 electrodes 68 and 69 are provided and are connected, as shown, to the terminals 14 and 15 of the high voltage secondary winding 13. The electrodes 68 and 69 may be in the form of wires or similar conductors and are disposed in transposed insulated relationship in a substantially vertical plane. The electrodes 68 and 69 are carried by suitable insulators 70 on suitable supports 71 which are grounded.

A detector electrode 72 is carried by insulators 73 on the supports 71 and is located in spaced relationship to and in the same plane as the electrodes 68 and 69. The detector 28 is connected between the detector electrode 72 and ground, as shown.

The arrangement of the electrodes 68 and 69 is such that the capacitance represented by the sum of the capacitance of capacitors 76 and 77, shown in broken lines, between the electrode 69 and the detector electrode 72 is equal to the sum of the capacitance of the capacitors 78 and 79, shown by broken lines, between the electrode 68 and the detector electrode 72. When this condition obtains the current flowing through the capacitors 76 and 77 will equal the current flowing through the capacitors 78 and 79. Consequently, no current will flow through the detector 28.

Now when there is a change in the capacitance of any of the capacitors 76, 77, 78 or 79, this balanced condition will be disturbed and current will flow through the detector 28. This may be caused by the presence of a foreign body between the portions of the electrodes 68 and 69 adjacent the detector electrode 72. A suitable signal can then be given as to the presence of the foreign body and necessary action can be taken.

As in the systems described hereinbefore, the detector 28 is unaffected because of the flow of stray currents through stray capacitance to ground from the high voltage secondary winding 13. Also, the flow of current through capacitance to ground from the detector electrode merely affects the sensitivity of the detector 28.

It will be obvious that many changes can be made in the foregoing system without departing from the spirit and scope of the present invention. Therefore, it is intended that all matter shown in the accompanying drawings and described hereinbefore shall be interpreted as illustrative and not in a limiting sense.

I claim as my invention:

1. Apparatus for detecting the presence of foreign bodies out of doors in various kinds of weather conditions comprising, in combination, a transformer having a primary winding connected to a source of alternating current and a relatively high voltage secondary winding having a center tap connected to ground, a pair of electrostatic main electrodes in insulated spaced relation energized from said transformer by connection to the terminals of said secondary winding, an electrostatic detector electrode insulated from ground and electrostatically substantially symmetrically disposed with respect to said pair of electrodes, and detector means connected at one side to said detector electrode and connected at the other side through ground to said center tap of the transformer secondary winding whereby substantially no current flows through said detector means under normal operating conditions, and whereby substantially no current flows through said detector means when leakage occurs between said main electrodes and ground because such leakage current is by-passed around said detector means through ground to said center tap, but whereby substantial current is caused to flow through said detector means when a foreign body substantially disturbs said electrostatic symmetry.

2. Apparatus for detecting the presence of foreign bodies out of doors in various kinds of weather conditions comprising, in combination, a transformer having a primary winding connected to a source of alternating current and a relatively high voltage secondary winding having a center tap connected to ground, a pair of electrostatic main electrodes energized from said transformer by connection to the terminals of said secondary winding, insulator means for each main electrode for supporting the same out of doors in spaced relation, grounded support means for said insulator means, an electrostatic detector electrode and insulator means for supporting the same out of doors and symmetrically with respect to the electrodes of said pair, grounded support means for the last named insulator means, and detector means connected at one side to said detector electrode and connected at the other side through ground to said center tap of the secondary winding, whereby substantially no current flows through said detector means under normal operating conditions and whereby substantially no current flows through said detector means when leakage occurs across said first named insulator means between said main electrodes and ground because such leakage current is by-passed around said detector means through ground to said center tap, but whereby substantial current is caused to flow through said detector means when a foreign body gets between either of said main electrodes and said detector electrode.

3. Apparatus for detecting the presence of foreign bodies out of doors in various kinds of weather conditions comprising, in combination, a transformer having a primary winding adapted to be connected to a source of alternating current and a relatively high voltage secondary winding having a tap intermediate its terminals adapted to be connected to ground, a pair of main electrodes adapted to be energized from said transformer by connection to said terminals of said secondary winding, insulator means for each main electrode for supporting the same out of doors in spaced relation, grounded support means for said insulator means, a detector electrode, insulator means for said detector electrode for supporting the same out of doors between said main electrodes, grounded support means for the last named insulator means, and detector means connected at one side to said detector electrode and connected at the other side to said intermediate tap through ground for measuring the change in current flow therebetween due only to the presence of a foreign body between either of said electrodes of said pair and said detector electrode.

4. Apparatus for detecting the presence of foreign bodies out of doors in various kinds of weather conditions comprising, in combination, a transformer having a primary winding adapted to be connected to a source of alternating current and a relatively high voltage secondary winding having an intermediate tap adapted to be connected to ground, a pair of main electrostatic electrodes adapted to be energized from said transformer by connection to the terminals of said secondary winding, insulator means for each main electrode for supporting the same out of doors in spaced relation, grounded support means for said insulator means, a detector electrostatic electrode and insulator means for supporting the same out of doors and symmetrically with respect to said main electrodes, grounded support means for the last named insulator means, detector means connected between said detector electrode and ground for measuring the current flow therebetween, the point of connection of said detector means with said secondary winding through ground and the relative spacing between said detector electrode and said main electrodes being so related to each other that substantially no current flows through said detector means under normal operating conditions but current does flow through said detector means when a foreign body gets between either of said main electrodes and said detector electrode, and electrostatic shielding means for said detector means whereby the latter is responsive only to current flow therethrough caused by change in the character of the dielectric between one of said pair of main electrodes and said detector electrode with respect to the character of the dielectric between the other of said pair of main electrodes and said detector electrode.

5. Detecting apparatus comprising, in combination, a transformer having a primary winding for connection to an alternating current source and a relatively high voltage secondary winding having a tap intermediate its terminals, a plurality of pairs of electrodes mounted in insulated spaced relation with corresponding electrodes of each pair connected together and for energization to the terminals of said secondary winding, a detector electrode disposed between each of said pairs of electrodes, and detector means connected between said detector electrodes and said tap of said secondary winding for measuring the flow of current therebetween due only to the presence of a foreign body between one of the electrodes of said pairs of electrodes and the associated detector electrode.

6. Apparatus for detecting the presence of foreign bodies out of doors in various kinds of weather conditions comprising, in combination, a transformer having a primary winding adapted to be connected to a source of alternating current and a relatively high voltage secondary winding having a center tap adapted to be connected to ground, a pair of main electrostatic electrodes in insulated spaced relation and extending in opposite directions and adapted to be energized from said transformer by connection to the terminals of said secondary winding, a detector electrostatic electrode insulated from ground and extending in parallel spaced relation relative to said pair of main electrodes whereby the capacitance between each electrode of said pair and said detector electrode is substantially the same, and detector means connected between said detector electrode and ground for measuring the current flow therebetween when a foreign body substantially changes the capacitance between one of said main electrodes and said detector electrode, there being substantially no current flow through said detector means as long as the capacitance between each main electrode and said detector electrode remains substantially the same.

7. Apparatus for detecting the presence of foreign bodies out of doors in various kinds of weather conditions comprising, in combination, a transformer having a primary winding adapted to be connected to a source of alternating current and a relatively high voltage secondary winding having a center tap adapted to be connected to ground, a pair of electrodes in insulated transposed relation in a plane adapted to be energized from said transformer by connection to the terminals of said secondary winding, a detector electrode in the plane of and in parallel spaced relation with respect to said pair of electrodes and insulated from ground whereby the capacitance between each electrode of said pair and said detector electrode is substantially the same, and detector means connected between said detector electrode and ground for measuring the current flow therebetween when a foreign body substantially changes the capacitance between one of said electrodes of said pair and said detector electrode, there being substantially no current flow through said detector means as long as the capacitance between each electrode of said pair and said detector electrode remains substantially the same.

8. An alarm system comprising three independent electrical conducting wires extending over an area, the approach to which is to be guarded, means for electrically energizing two of said wires providing dual capacitance to the third wire, arranged and dimensioned to be substantially proportionally affected by normal weather changes, detector means, including alarm means, operatively connected between said third wire and ground having electrical characteristics maintaining said alarm means unoperated during normal weather changes, substantially proportionally affecting the capacitance of said two energized wires to said third wire, and operating said alarm means when the capacitance of said two energized wires to said third wire are non-proportionately affected as by the approach of a foreign object to said wires.

9. An alarm system comprising three independent electrical conducting wires extending over an area, the approach to which is to be guarded, means providing a source of high voltage alternating current connected across two of said wires and having a connection intermediate the connections to said two energized wires, the energization of said two latter wires providing dual capacitance to the third wire, arranged and dimensioned to be substantially proportionally affected by normal weather changes, and detector means connected between said third wire and said intermediate connection of said source having electrical characteristics maintaining said detector means unoperated during normal weather changes substantially proportionally affecting the capacitance of said two energized wires to said third wire, and operating said detector means when the capacitance of said two energized wires to said third wire are non-proportionately affected as by the approach of a foreign object to said wires.

10. An alarm system comprising three independent electrical conducting wires extending over an area, the approach to which is to be guarded, a transformer having a primary winding adapted to be connected to a source of alternating current and a relatively high voltage secondary winding having an intermediate tap adapted to be connected to ground, the terminals of said secondary winding being connected to two of said wires, such energization of said two wires providing dual capacitance to the third wire, arranged and dimensioned to be substantially proportionally affected by normal weather changes, detector means connected between said third wire and ground having electrical characteristics maintaining said detector means unoperated during normal weather changes substantially proportionally affecting the capacitance of said two energized wires to said third wire, and operating said detector means when the capacitance of said two energized wires to said third wire are non-proportionately affected as by the approach of a foreign object to said wires.

ALLAN L. BROWNLEE.

REFERENCES CITED

The following references are of record in the file of this patent:

UNITED STATES PATENTS

| Number | Name | Date |
| --- | --- | --- |
| 2,147,748 | Luck et al. | Feb. 21, 1939 |
| 1,375,414 | Osborne | Apr. 19, 1921 |
| 2,097,760 | Failla | Nov. 2, 1937 |

FOREIGN PATENTS

| Number | Country | Date |
| --- | --- | --- |
| 284,307 | Great Britain | Jan. 29, 1929 |
| 346,061 | Great Britain | Apr. 9, 1931 |